(12) United States Patent
Holzermer et al.

(10) Patent No.: US 8,073,098 B2
(45) Date of Patent: Dec. 6, 2011

(54) AIR BEARING TO SUPPORT A BODY

(75) Inventors: Uli Holzermer, Erlangen (DE);
Hans-Juergen Mueller, Pretzfeld (DE);
Christian Willming, Forchheim (DE)

(73) Assignee: Siemens Aktiengesellschaft, Munich (DE)

( * ) Notice: Subject to any disclaimer, the term of this patent is extended or adjusted under 35 U.S.C. 154(b) by 65 days.

(21) Appl. No.: 12/568,427

(22) Filed: Sep. 28, 2009

(65) Prior Publication Data

US 2010/0080340 A1 Apr. 1, 2010

(30) Foreign Application Priority Data

Sep. 26, 2008 (DE) .......................... 10 2008 049 050

(51) Int. Cl.
*A61B 6/00* (2006.01)
(52) U.S. Cl. .......................................... 378/15; 378/197
(58) Field of Classification Search .................. 378/4, 15, 378/197; 384/114, 116
See application file for complete search history.

(56) References Cited

U.S. PATENT DOCUMENTS

| | | | |
|---|---|---|---|
| 4,834,559 A | 5/1989 | Kalvoda | |
| 5,382,096 A | 1/1995 | Stein et al. | |
| 6,276,145 B1 * | 8/2001 | Sharpless et al. | 62/51.1 |
| 7,394,076 B2 | 7/2008 | Devitt | |

FOREIGN PATENT DOCUMENTS

JP 09177783 A 7/1997

OTHER PUBLICATIONS

"Air Bearing Slewing Rings Specification Sheet" Newway Air Bearings (2007).
"Air Bearing Application and Design Guide", Newway Air Bearings (2006).
"Radial Air Bearing Product Specifications," Newway Air Bearings (2007).

* cited by examiner

*Primary Examiner* — Jurie Yun
(74) *Attorney, Agent, or Firm* — Schiff Hardin LLP

(57) ABSTRACT

An air bearing has a rotor having a circularly curved radial rotor bearing surface along its circumferential direction. The air bearing also has a stator having at least one radial stator bearing surface partially enclosing the rotor in the circumferential direction. The radial stator bearing surface is curved according to a profile following the circumferential direction of the rotor and is fashioned to generate an air gap between it and the radial rotor bearing surface so that, upon operation, the rotor is borne, supported by an air current in the air gap. The profile shapes the air gap such that, at a starting temperature that deviates from an operating temperature, the air gap has a smaller thickness (measured in the radial direction) in a second region of the radial stator bearing surface in comparison to a first region of the radial stator bearing surface along the circumferential direction.

16 Claims, 19 Drawing Sheets

FIG 2D
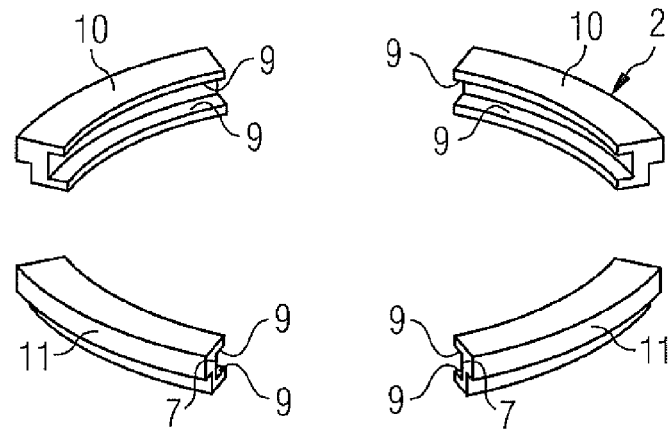
FIG 2E
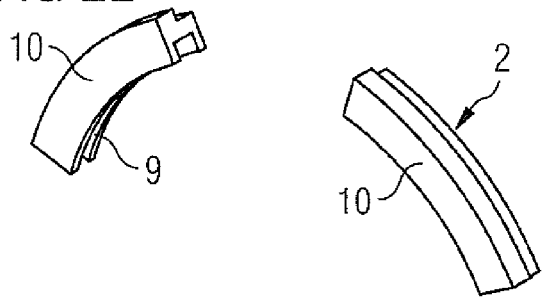
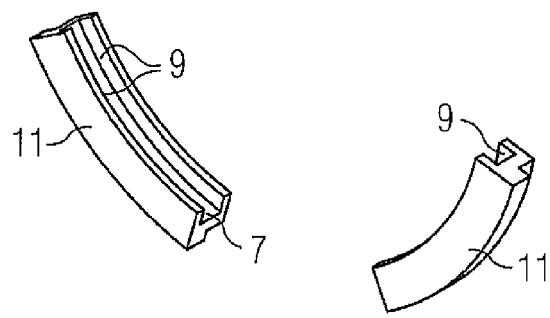
FIG 2F
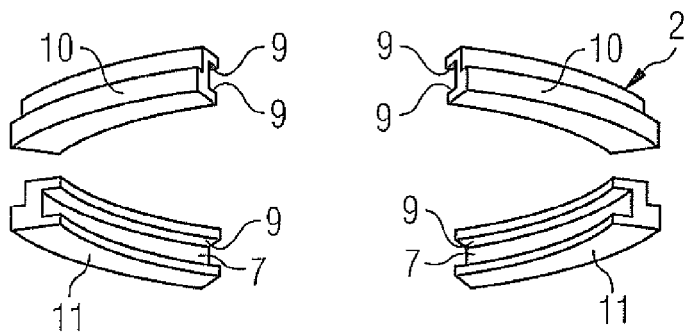

FIG 2G
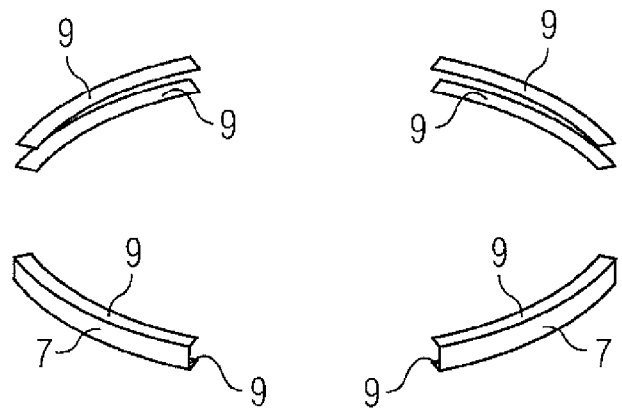
FIG 2H
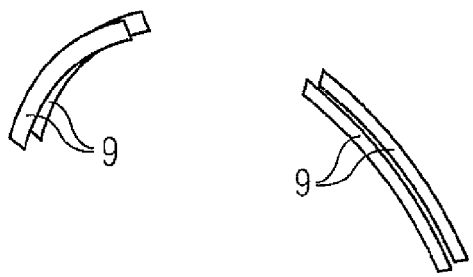
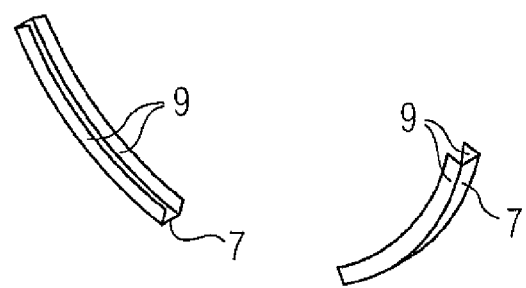
FIG 2I
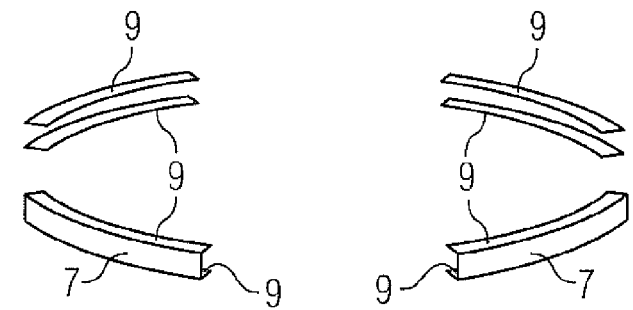

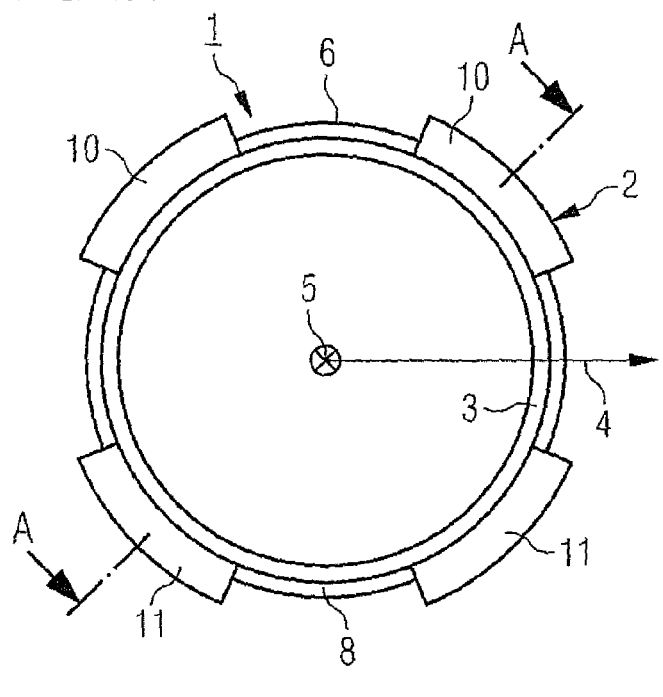
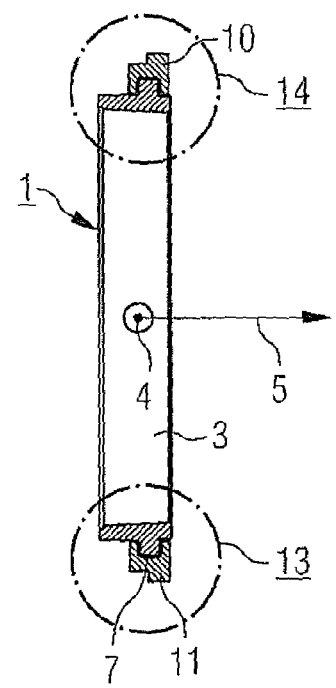
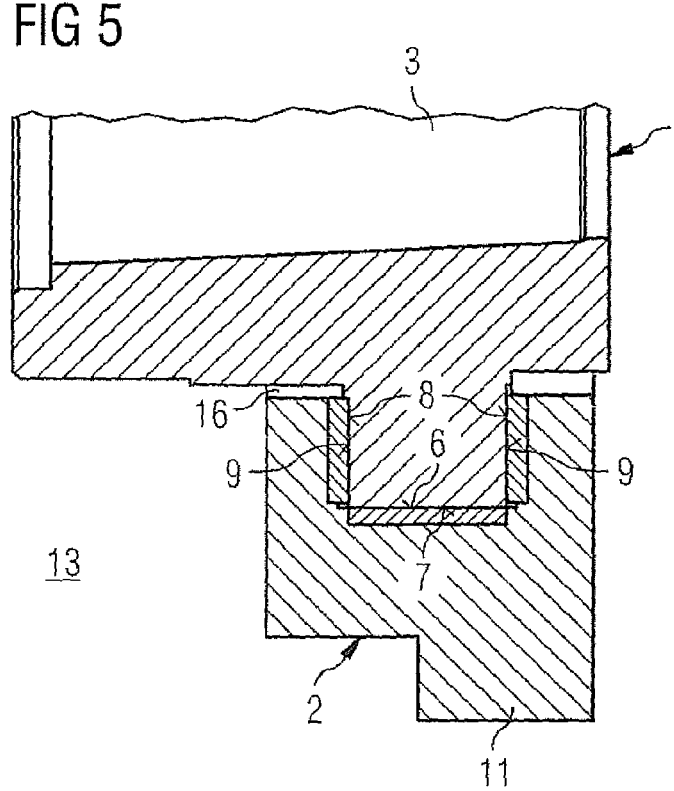

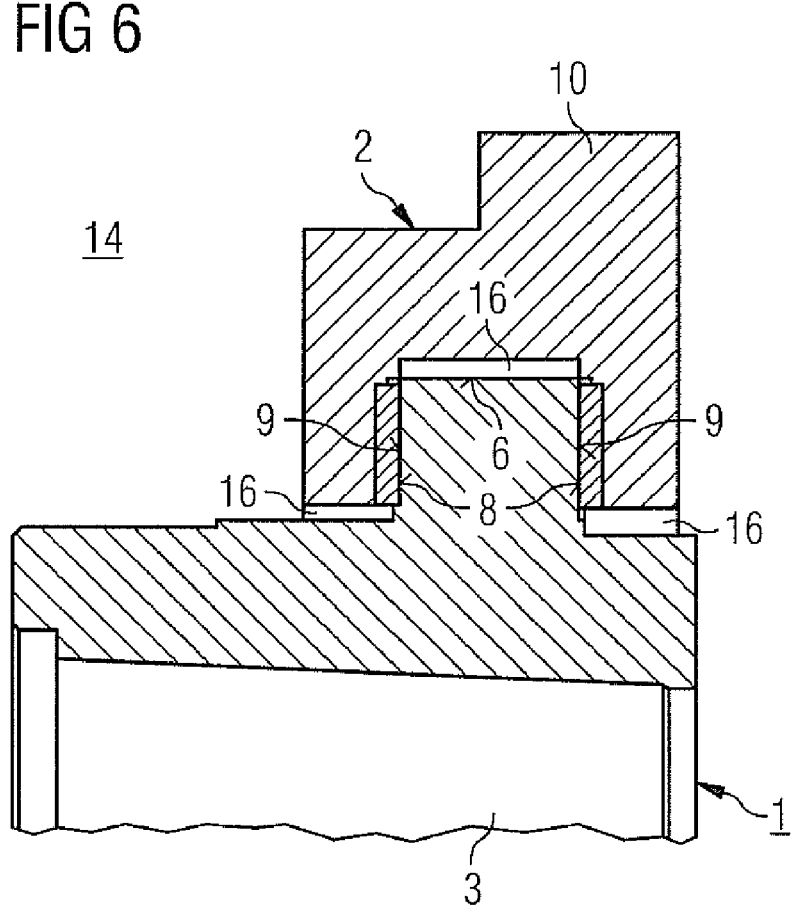

FIG 10A
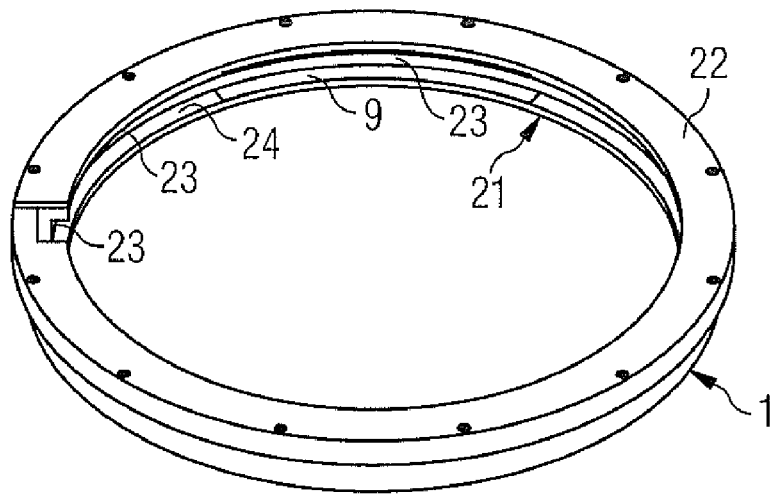
FIG 10B

FIG 11A
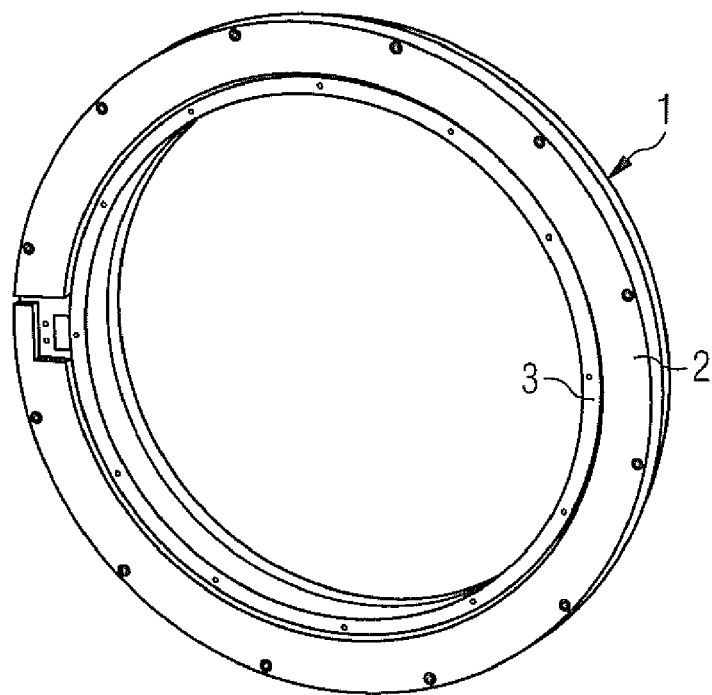
FIG 11B

FIG 12A
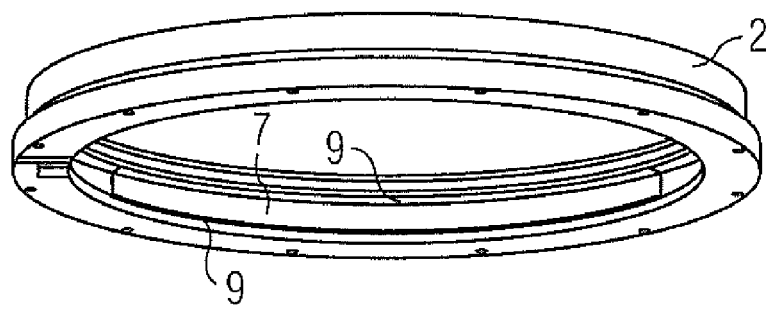
FIG 12B

AIR BEARING TO SUPPORT A BODY

BACKGROUND OF THE INVENTION

1. Field of the Invention

The invention concerns an air bearing and a use of such an air bearing.

2. Description of the Prior Art

In contrast to conventional bearings, known air bearings are characterized by their practically negligible friction and aging as well as by their high-precision and high-speed capability. The absence of oil is likewise of decisive importance because this significantly expands the field of use (for example in dusty environments), and the maintenance of the oil system is simultaneously foregone. Instead of the oil, in an air bearing an air film or an air flow in a relatively narrow air column produces a contact-free bearing. A stator and a rotor to which a body is attached interact via the air film.

The basic positive properties of air bearings have facilitated the entry of air bearings into the medical technology field. The requirements for an air bearing in this field can be summarized as being that they should run without need of maintenance, quietly and stably, over a wide temperature range, independent of the rotational frequency. Optimally small installation volumes and cost-effective solutions are additionally required.

An example of an air bearing that approaches these properties required in medical technology is commercially available from the company NEWWAY with headquarters at 50 McDonald Blvd., Aston, Pa., 19014, USA, under the name Air Bearing Slewing Rings, and is depicted in a cross-section representation in FIG. 1. This type of an air bearing is in the form of a positive air bearing 1 in which, according to one embodiment, a stator 2 of annular design, which can be mounted firmly in an apparatus, has on its inner side, a rotor 3 that is fashioned in one piece and likewise in annular form. The rotor 3 is completely enclosed by the stator 2 at its outer side in the radial direction (characterized by the first arrow 4) and at least partially in the axial direction (characterized by the second arrow 5). Conforming to an external, circumferential (peripheral) rotor surface that forms a radial rotor bearing surface, the stator 2 has a circumferential radial stator bearing surface 7 that is fashioned for supportive bearing of the rotor 3 or of a body connected with the rotor 3 in the radial direction 4 of the rotor 3. The stator 2 additionally has circumferential axial stator bearing surfaces 9 (corresponding to the body surfaces of the rotor 3 that are oriented in the axial direction 5 and form axial rotor bearing surfaces 8) that are fashioned for supportive bearing of the rotor 3 or of a body connected with the rotor in the axial direction 5. To generate the air gap necessary for bearing, the radius of the radial rotor bearing surface 6 and the radius of the radial stator bearing surface 7 differ slightly. The air gap formed upon operation has an essentially homogeneous thickness along the bearing surfaces 7 in the circumferential direction.

This type of positive air bearing 1 does in fact satisfy the criterion of the space-saving design. This known air bearing 1, however, exhibits relatively tight limit values with regard to its operating temperatures, which hinders the use of this air bearing. This problem occurs because—due to the 360° design of the stator 2 surrounding the rotor 3—the air bearing 1 may be operated only with a slight temperature difference between the rotor 3 and the stator 2, since otherwise the danger exists that excessive heating of the rotor 3, and an associated expansion of the rotor 3, can lead to a seizing of the rotor 3 and the stator 2. This situation is exacerbated by the use of different materials. The rotor 3 is typically made of steel and the radial stator bearing surface is made of a porous graphite. Since steel has a much greater value of the coefficient of thermal expansion than graphite, in this known bearing seizing between stator and the positively embedded rotor is inevitably to be expected. Although this could in principle be counteracted by two measures, neither of these measures nor their consequences are desirable. One possibility would be to continuously cool the rotor 3, but this is cost-intensive and complicated. Another possibility would be to increase the air gap thickness between the rotor 3 and the stator 2, but the effectiveness of the air bearing would then be decreased, because the thickness of the air gap must be relatively small (for example in the range of $\frac{1}{1000}$ mm) in order to obtain an effective bearing. It should also be noted that, very generally, an air bearing 1 with a smaller air gap can bear (support) a larger load than an air bearing 1 with a larger air gap.

SUMMARY OF THE INVENTION

An object of the present invention is to further develop an air bearing of the aforementioned type such that the described problems are remedied and an improved air bearing is obtained.

According to the invention, the air bearing has a rotor having a circularly curved radial rotor bearing surface along its circumferential direction and a stator, the stator having at least one radial stator bearing surface running partially adjacent to the rotor in the circumferential direction, and that partially encloses the rotor in the circumferential direction in a preferred embodiment. The radial stator bearing surface is curved according to a profile following the circumferential direction of the rotor and is fashioned to generate an air gap between it and the radial rotor bearing surface so that, upon operation, the rotor supported is borne by an air current in the air gap. The profile is designed to create an air gap between the radial stator bearing surface and the radial rotor bearing surface that at a starting temperature that deviates from an operating temperature (T2), is of a smaller thickness (measured in the radial direction) in a second region of the radial stator bearing surface in comparison to a first region of the radial stator bearing surface, the two regions running in the circumferential direction.

Due to the measure according to the invention, the air bearing can no longer seize. This is achieved by virtue of the (for example external) radial stator bearing surface no longer completely encloses the rotor but rather is fashioned in the form of at least one segment, and specially shaped profile of the radial stator bearing surface additionally allows an expansion of the rotor without a contact between the rotor and the radial stator bearing surface that occurs due to heat generated during operation of the air bearing. The profile allows the rotor to expend while still maintaining the supporting, bearing air film, because the design of the profile takes into account the thermal expansion. It is thereby ensured that the rotor can approach the profile of the radial stator bearing surface in a controlled manner given a thermal expansion but without contacting the stator. Expressed differently, the radial stator bearing surface can cope with a thermal expansion of the rotor in the radial direction without having to reckon with a contact due to thermal effects. Given a deactivated air bearing—thus when no air flows through the radial stator bearing surfaces that are made from (for example) porous graphite—the rotor is essentially seated in the second region where a supporting air film is first generated when air flows through the radial stator bearing surfaces. In the course of operation of the air bearing, the rotor will thermally expand more significantly than the radial stator bearing surface, and thus will approach the first region such that there the supporting effect of the bearing is also increased by the reduction of the thickness of the air gap. Differing from a radial stator bearing surface having a purely circular profile that has a constant radius along the circumferential direction of the rotor, the profile according to the invention ensures that the rotor expanding due to thermal effects does not "seat" at the edges of the segmented radial stator bearing surface so that the bearing effect of the air film between the rotor and the radial stator bearing surface would be lost. The same effects or advantages of the outer radial stator bearing surfaces are also achieved at the inner radial stator bearing surfaces.

In a preferred exemplary embodiment of the invention, the profile is produced or dimensioned to cause, at the operating temperature, the air gap formed between the radial stator bearing surface and the radial rotor bearing surface to have an essentially homogeneous thickness along the circumferential direction of the rotor. It is thereby ensured that the air bearing delivers the type of performance at the operating temperature that is typical (expected) during operation.

The shape of the radial stator bearing surface can be asymmetrical, for example, such that—viewed in the circumferential direction of the rotor—the first region can be localized in the area at a first edge of the radial stator bearing surface, and the second region can be localized in the area at a second edge of the radial stator bearing surface. Embodiments also can be used in which the second region is surrounded to the left and right of its position with first regions of different sizes. According to a preferred form of the radial stator bearing surface, the radial stator bearing surface is produced such that the first region forms a border region of the radial stator bearing surface and the second region forms a central region of the radial stator bearing surface, and the profile is symmetrical relative to a central line of the central region. The optimal utilization of the effective area of the air bearing is thereby attained because this shape promotes the use centrally below the rotor. The designations "central region" and "radial region" of the radial stator bearing surface are to be understood as meaning that the rotor contacts the radial stator bearing surface in a central region given a deactivated air bearing. This contact will generally occur along a contact line running in an axial direction of the rotor, namely what is known as the central line. The border region of the radial stator bearing surface is thus essentially any circumferentially running region of the radial stator bearing surface that proceeds from the central region or the contact line toward the right or left end of the radial stator bearing surface. At the initial temperature T1, the air gap measured in the central region and compared with the border region will thus exhibit the greatest difference.

The profile that describes the shape of the radial stator bearing surface and ultimately the curve of the thickness of the air gap can be realized in numerous ways. One description of this profile can be an elliptical shape, for example. Steps, or even better, structures like micro-steps that run from the central region toward the border region are also possible. In a preferred embodiment, the profile is produced according to the function $$r(\varphi) = R_{T1} + \Delta r \cdot \frac{\varphi}{\hat{\varphi}},$$

wherein RT1 is the radius of a rotor plus a nominal thickness of the air gap at the initial temperature; $\hat{\varphi}$ is an angle segment that spans half of the radial stator bearing surface measured from its center to its edge, following the circumferential direction of the rotor; $\Delta r$ is a radius difference of the rotor between the initial temperature and the operating temperature; and $\varphi$ is an angle parameter that is variable in a range between $0 \leq \varphi \leq \hat{\varphi}$ which angle parameter parameterizes the radius difference $\Delta r$ along the angle segment $\hat{\varphi}$. This functional description of the profile essentially represents a curve or, more precisely, represents a spiral segment in which the radius varies continuously as a function of the angle measured from the central region outward to the border region.

Since, in an air bearing the effective active area of the air bearing is provided by the projection of the radial stator bearing surface on a plane normal to the force of gravity, it has proven to be advantageous to position at least one radial stator bearing surface in the circumferential direction such that its second region (preferably its central region) coincides with the projection of the center of gravity of the rotor on the radial stator bearing surface. The advantage is thereby gained that the largest effective active bearing surface is provided. However, it should be noted that this effect can be achieved not only for a single such-positioned segment of a radial stator bearing surface that is centrally positioned below the rotor. Rather, an arrangement of individual segments of the radial stator bearing surface in sequence below the rotor is also possible in order to obtain an optimally large effective surface in an equivalent manner.

As already discussed, the thermal expansion of the rotor plays a decisive role so that, in the design of the stator, not only must the radial stator bearing surface considered, but also consideration must be given to any regions that are free of radial stator bearing surfaces in order to also reliably prevent contact between the stator and the rotor in this regions given a thermal expansion of the rotor. Accordingly, in a preferred embodiment, the stator exhibits, on its side facing toward the rotor along the circumferential direction, a radial expansion at points that are free of the at least one radial stator bearing surface, this radial expansion being greater than that radial expansion that is required upon operation by the air-borne rotor at the operating temperature. It is thereby ensured that the air-borne, supported rotor can thermally expand not only in the region of the radial stator bearing surfaces but also in other regions that, for example, can be localized diametrically to the radial stator bearing surfaces.

According to an additional aspect of the invention, the stator has at least two axial stator bearing surfaces that are fashioned for axially-supportive bearing of the rotor in the axial direction of the rotor. These at least two axial stator bearing surfaces allow—insofar as they are mounted at the correct circumferential positions—a compensation of tilting moments that act on the rotor.

In connection with the aforementioned at least two axial stator bearing surfaces, it has proven to be particularly advantageous for these to be fashioned or positioned corresponding to the position of the at least one radial stator bearing surface at the stator, because then not only a supporting effect of the air bearing, but also an axially supportive effect of the air bearing, is achieved.

An additional aspect of the invention concerns the provision of at least two additional radial stator bearing surfaces essentially axially opposite the position of the at least one radial stator bearing surface at the stator, so that a tilting moment that acts on the rotor can also be effectively counteracted at these positions.

According to a preferred exemplary embodiment of the invention, the stator has a housing, or is realized as a housing according to a preferred exemplary embodiment, this housing circumferentially enclosing the rotor with an inner annular stator wall, and the at least one radial stator bearing surface is attached to the inner annular stator wall. The attachment can ensue by (for example) gluing the radial stator bearing surface to the inner annular stator wall or by other known measures, for example by the insertion of a support that bears the radial stator bearing surface. Through the use of a separate support to which the radial stator bearing surface is attached, the radial stator bearing surface can be preassembled in a simple manner so that ultimately only the support with the inner annular stator wall must be connected to correspondingly fashioned points provided for this purpose. The fashioning of the stator as a housing enables a particularly compact design and use of the air bearing, as well as efficient handling thereof.

In a preferred embodiment of the housing, the housing at least partially surrounds the rotor at two different axial positions of the rotor in its radial direction with inner stator side walls and, of the at least two axial stator bearing surfaces, one of these axial stator bearing surfaces is axially mounted relative to the other axial stator bearing surface. This allows all stator-related bearing surfaces are accommodated in the housing in an optimally efficient manner so that the air bearing can exert both bearing and supporting functions while at the same time having an optimally compact design.

According to a further embodiment, the stator can be formed by a number of segments to which the at least one radial stator bearing surface is attached and/or the axial stator bearing surfaces are attached. This embodiment is advantageous if, in the design of an apparatus, it is required that the positioning of such segments should ensue as flexibly and variably as possible without, however, requiring a housing or similar measures. However, for stability reasons it has also proven to be advantageous in this embodiment for the individual segments to be held or supported by (for example) a stabilizing ring or a cage-like structure.

According to a preferred exemplary embodiment of the invention, the rotor has a flange that is fashioned for the attachment of a drum of a computed tomography system. The advantage is thereby obtained that the proper use of the air bearing according to the design in such a system can take place as simply as possible.

Preferably, the bearing surfaces are made of a porous graphite that, relative to the nozzle-like embodiments that can likewise be used according to the invention, has the advantage of the generation of a more homogeneous air film. In comparison to the use of a nozzle-like embodiment, the use of a porous material (for example graphite, sintering coal or even sintered metals, for example sintered bronze) an essentially more finely porous, nearly laminar air-emitting bearing surface can be realized by the injection of the air to activate the air bearing.

The embodiments and advantages described here in connection with the air bearing according to the invention also apply in an analogous manner to the use of the air bearing according to the invention in a computed tomography system in which a drum is borne in a drum carrier by the air bearing.

BRIEF DESCRIPTION OF THE DRAWINGS

FIG. 4A schematically shows a frontal view of the air bearing according to FIGS. 2A, 2B and 2C along section line A-A.

FIG. 4B schematically shows section of the air bearing according to FIG. 4A along the section line A-A, with an indicated first detail and a second detail.

FIG. 5 is a section through the first detail in FIG. 4B.

FIG. 6 is a section through the second detail in FIG. 4B,

FIG. 10A is a diagonal section of a stator of an air bearing according to the invention in a first perspective according to a third exemplary embodiment, the stator being fashioned as a housing.

FIG. 10B shows an arrangement of bearing surfaces of the stator according to the first perspective, the arrangement being shown detached from the stator according to FIG. 10A.

FIG. 11A is a diagonal section of a combination of the stator according to FIG. 10A with a rotor in a second perspective.

FIG. 11B shows the bearing surfaces according to FIG. 10B in the second perspective.

FIG. 12A shows the stator according to FIG. 10A in a third perspective.

FIG. 12B shows the bearing surfaces according to FIG. 10A in a third perspective.

DESCRIPTION OF THE PREFERRED EMBODIMENTS

Figure 1:
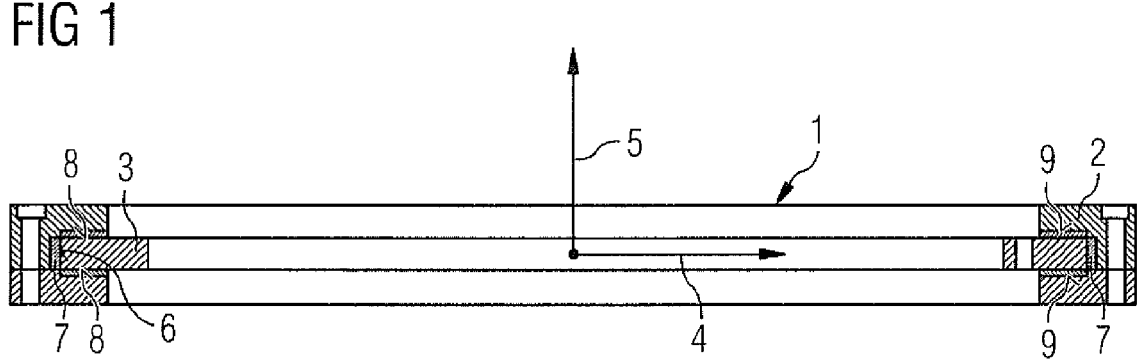
FIG. 1 schematically illustrates a cross section through a positive air bearing according to the prior art, FIGS. 2A, 2B and 2C, analogous to FIG. 1, each show a diagonal section of an air bearing according to the invention that has a segmented stator and a rotor according to a first exemplary embodiment of the invention from three different perspectives.
Figure 2A:
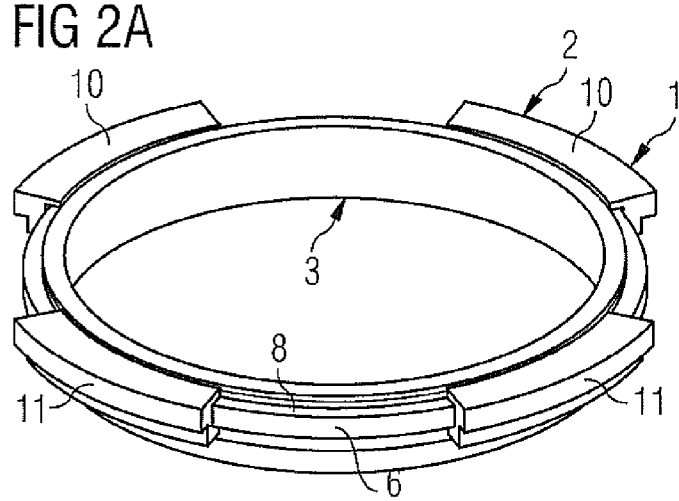
FIGS. 2D, 2E and 2F in perspective views, analogous to FIGS. 2A, 2B, 2C, show the segmented stator of the air bearing according to the invention detached from the rotor.
FIGS. 2G, 2H and 2I, in perspective views, analogous to FIGS. 2A, 2B, 2C, show bearing surfaces of the stator of the air bearing according to the invention.
FIGS. 2J, 2K and 2L, in a perspective views analogous to FIGS. 2A, 2B, 2C, show an interaction of the bearing surfaces of the stator with the rotor of the air bearing according to the invention.

In the sequence of FIGS. 2A through 2A, a diagonal section of an air bearing 1 according to the invention is shown according to a first exemplary embodiment is shown. The air bearing 1 has a stator 2 that, in the present case, is formed by four segments. The four segments of the stator 2 or their positions are shown in the sequence of FIGS. 2D through 2F. The four segments of the stator 2 are formed by two support bearings 10 that are provided in a later installation position or, respectively, orientation of the air bearing 1 in the upper half of the air bearing 1, and by two combined journal and support bearings 11 that are provided in the lower half of the air bearing 1. The journal and support bearings 11 as well as the support bearings 10 are fashioned so as to be of positive construction so that the rotor 3 is surrounded at least on three sides at the point at which they are positioned. Clearly visible is a radial rotor bearing surface axial 6 that interacts in a supporting manner with the positive and combined journal and support bearings 11. Likewise visible is one of two axial rotor bearing surfaces 8 which interact with corresponding axial stator bearing surfaces 9. The position of the radial stator bearing surfaces 7 and the position of the axial stator bearing surfaces 9 is shown detached from the four segments of the stator 2 in the sequence of FIGS. 2G through 2I. An interaction of the radial stator bearing surfaces 7 and the axial stator bearing surfaces 9 with the rotor 3 is shown in the sequence of FIGS. 2J through 2L.

Figure 2J:
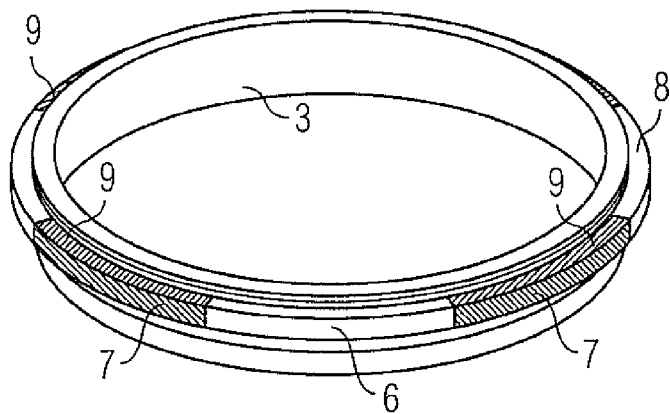
Figure 2K:
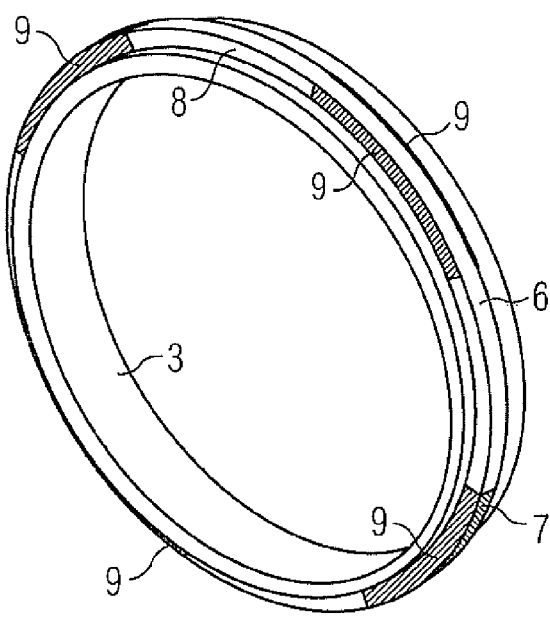
Figure 2L:
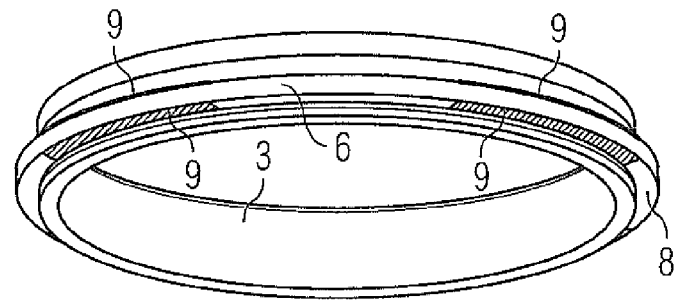
Figure 3A:
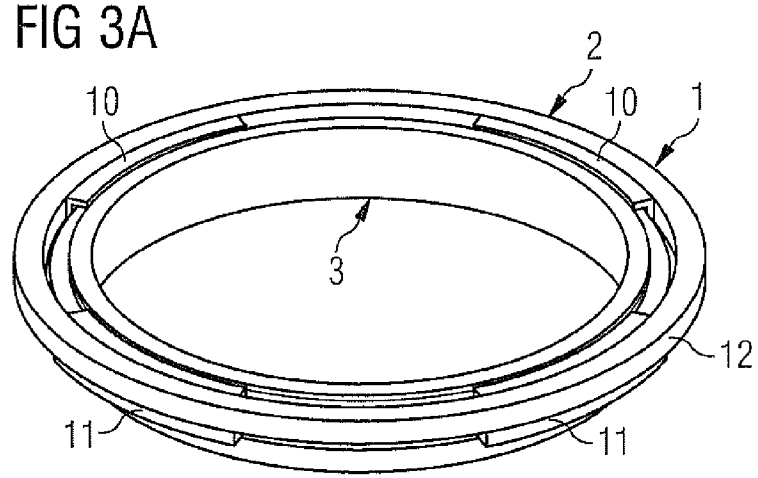
FIGS. 3A, 3B and 3C, analogous to FIGS. 2A, 2B, 2C, show the air bearing according to the invention according to a second exemplary embodiment, from three different perspectives, FIGS. 3D, 3E and 3F, in perspective views analogous to FIGS. 3A, 3B, 3C, show the stator of the air bearing according to the invention detached from the rotor, with a reinforcement and attachment ring.
Figure 3B:
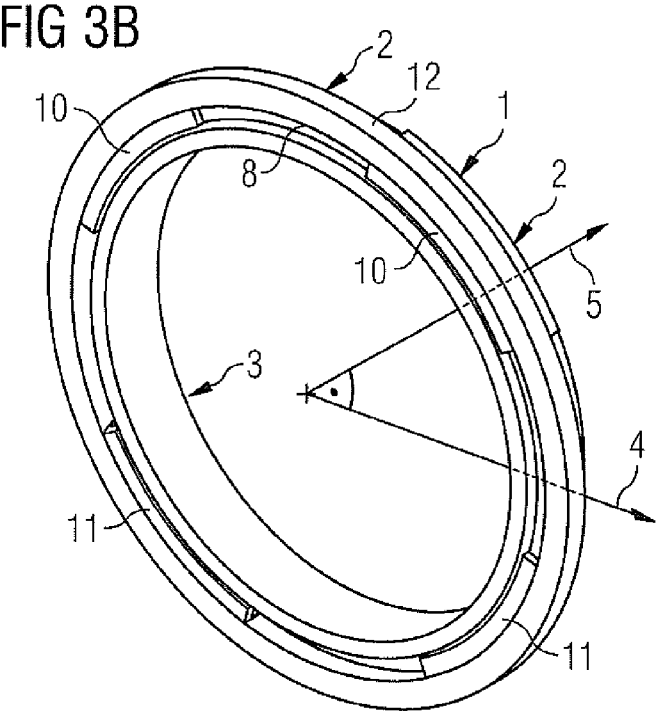
Figure 3C:
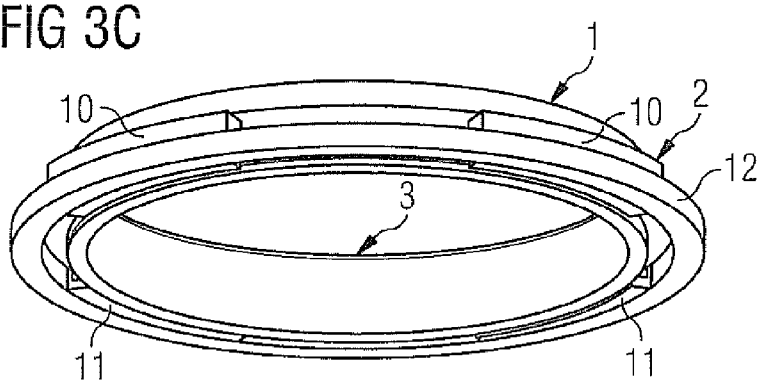
Figure 3D:
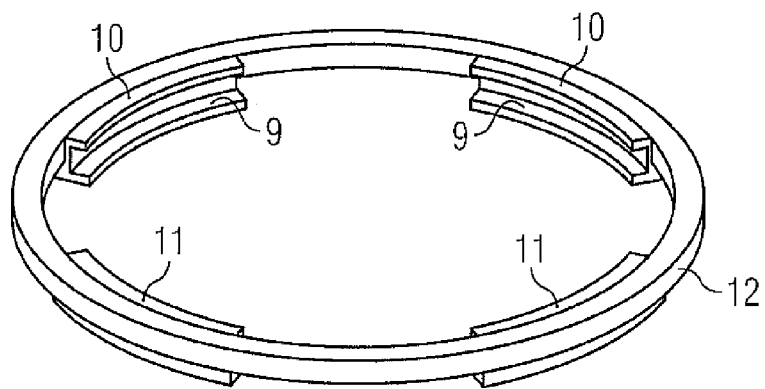
FIGS. 3G, 3H and 3I, in perspective views analogous to FIGS. 3A, 3B, 3C, show bearing surfaces of the stator of the air bearing according to the invention.
FIGS. 3J, 3K and 3L, in perspective views analogous to FIGS. 3A, 3B, 3C, show an interaction of the bearing surfaces of the stator with the rotor of the air bearing according to the invention.
Figure 3E:
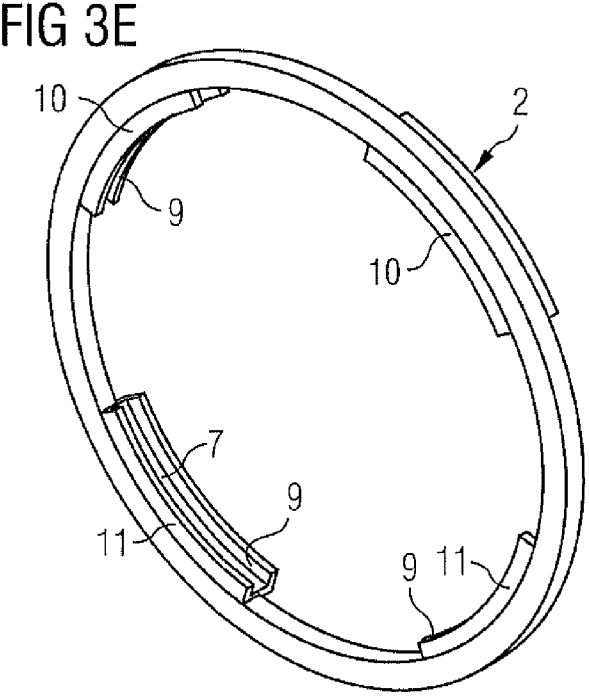
Figure 3F:
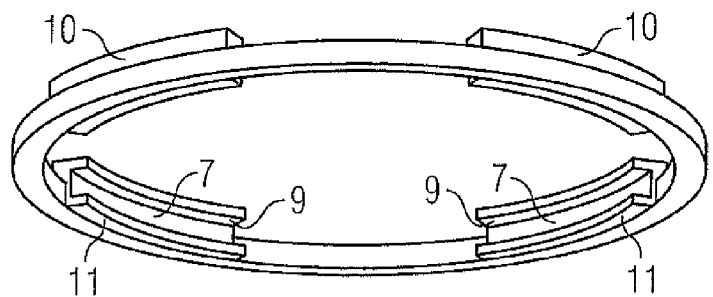
Figure 3G:
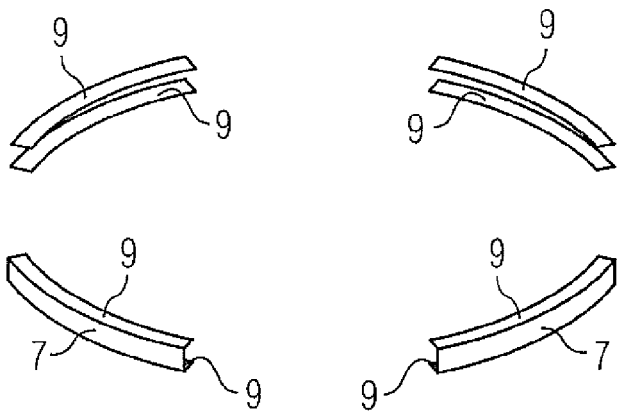
Figure 3H:
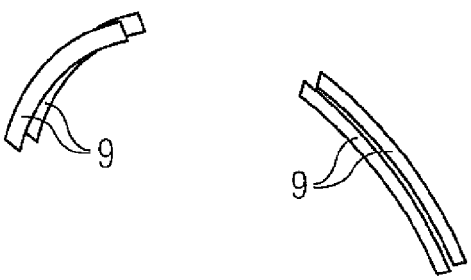
Figure 3I:
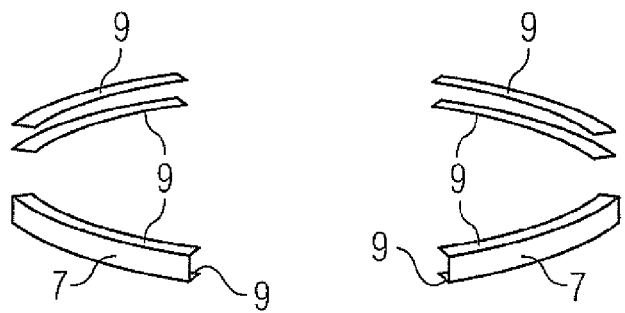
Figure 3J:
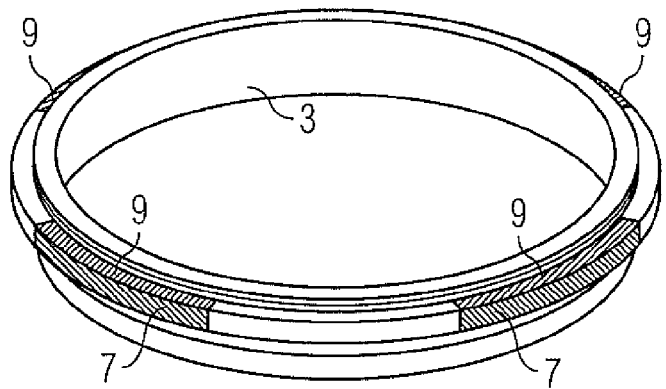
Figure 3K:
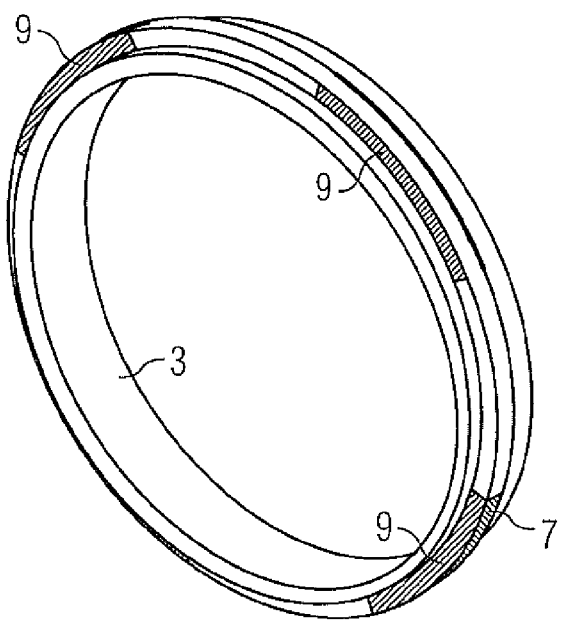
Figure 3L:
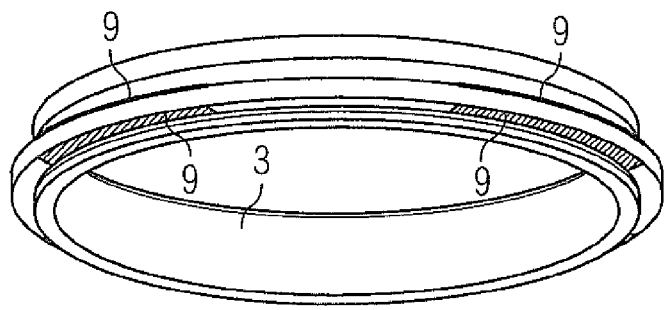

An additional exemplary embodiment of the air bearing 1 according to the invention is shown in the sequence of FIGS. 3A through 3C, wherein in the present case the two support bearings 10 and the two combined journal and support bearings 11 are connected with one another by a reinforcement and attachment ring 12. A significant increase of the rigidity of the air bearing 1 and a compact and simple attachment possibility for the air bearing 1 is thereby achieved. In contrast to FIGS. 2D through 2F, in the sequence of FIGS. 3D through 3F the four segments of the stator 2 that are connected with the reinforcement ring and attachment ring are visible. In the present case as well, the position of the radial stator bearing surfaces 7 and the position of the axial stator bearing surfaces 9 is shown detached from the four segments of the stator 2 in the sequence of FIGS. 3G through 3I. Analogous to FIGS. 2J through 2L, an interaction of the radial stator bearing surfaces 7 and the axial stator bearing surfaces 9 with the rotor 3 is also visualized for this exemplary embodiment in the sequence of FIGS. 3J through 3L.

The air bearing 1 according to the invention and which is shown in FIG. 2 is shown in a frontal view in FIG. 4A, wherein a section line A-A is shown. FIG. 4B shows the air bearing 1 sectioned according to the second line A-A, wherein two details 13 and 14 (namely a section through one of the support bearings 10 and a section through one of the journal and support bearings 11) are indicated.

FIG. 5 shows (with significant enlargement) the first detail 13 of the journal and support bearing 11 that is indicated in FIG. 4B. Shown is a section through the journal and support bearing 11 and the corresponding part of the rotor 3. In this first detail 13 the positive (namely U-shaped) enclosing of the rotor bearing surfaces 8 and 6 by the journal and support bearings 11. Also visible are the two axial stator bearing surfaces 9 (provided corresponding to the axial rotor bearing surfaces 8) and the radial stator bearing surface 7 (corresponding to the radial rotor bearing surface 6). Due to the chosen scale, in the present depiction the air gap present between the respective pairs of bearing surfaces 6, 7, 8 and 9 is not visible. The design of the combined journal and support bearing 11 and the rotor 3 is such that spacing regions 15 are provided between the rotor 3 and the regions of the journal and support bearing 11 placed adjacent to the rotor 3, whereby a contact between the journal and support bearing 11 and the rotor 3 in these regions is not possible.

The second detail 14 which shows an enlarged section through the support bearing 10 and the corresponding part of the rotor 3 is presented in FIG. 6. According to the function of the support bearing 10, the support bearing has two axial stator bearing surfaces 9 that are positioned corresponding to the axial rotor bearing surfaces 8. According to one aspect of the invention, the stator 2 is dimensioned in the region of the support bearings 10 such that expansion joints 16 are provided. These expansion joints 16 enable the rotor 3 to be able to expand from an initial temperature T1 up to an operating temperature T2 without a mechanical contact between the rotor 3 and the support bearing 10 occurring in the radial direction 4. In the present case, the support bearings 10 are thus free of radial stator bearing surfaces 7 so that the stator 2 has a radial expansion along the circumferential direction (thus precisely in the region of the support bearings 10 on its side facing toward the rotor 3 at points that are free of radial stator bearing surfaces 7) that is greater than that radial expansion that is required by the air-borne rotor 3 at the operating temperature T2 upon operation. In the case of the reinforcement and attachment ring 12 shown in FIGS. 3A-3L, this design safety feature is also advantageously applied to this ring 12.

In the following, the shape of a profile of the radial stator bearing surface 6 according to the invention is explained using a disadvantageous embodiment shown in FIGS. 7A and 7B or an embodiment according to the invention in FIGS. 8A and 8B.

Figure 7A:
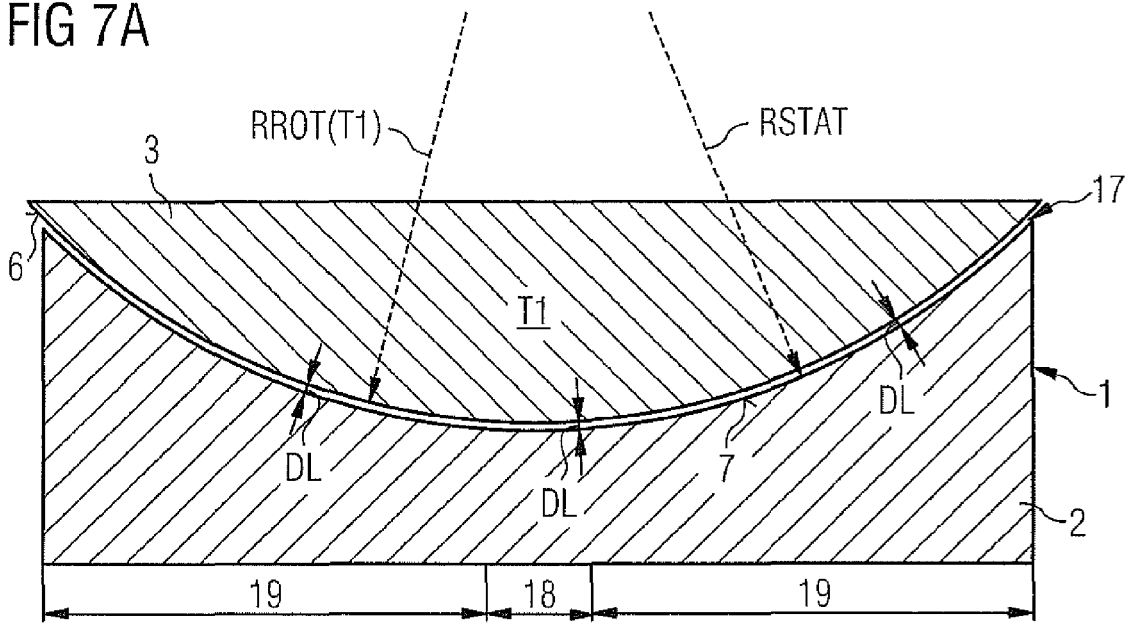
FIGS. 7A and 7B schematically illustrates of the problem of thermal expansion of a rotor in an air bearing that is not according to the invention, with a segmented radial stator bearing surface.

In order to clearly illustrate the effect of the measure according to the invention, in FIG. 7A the rotor 3 (or, more precisely stated, a part of the rotor 3 situated opposite the radial stator bearing surface 7) is shown in a cold state, thus at an initial temperature T1. The radial stator bearing surface 7 which only partially surrounds the rotor 3 in the circumferential direction is likewise shown. The radial stator bearing surface 7 follows the circumferential direction of the rotor 3 in a curved shape according to a defined profile so that an air gap 17 can form between the radial stator bearing surface 7 and the radial rotor bearing surface 3. In operation, the rotor 3 is then supported by an air flow or air film prevailing in the air gap. Ideally, the air gap 17 has a constant thickness DL over the entire circumferential length of the radial stator bearing surface 7 as this is shown in FIG. 7A. A rotor radius RROT(T1) of the rotor 3 at the initial temperature T1 is indicated in FIG. 7A. A stator radius RSTAT of the stator 2 is likewise shown in FIG. 7A. Furthermore, a central region 18 and a two adjacently (namely to the left and right of the central region 18) border regions 19 of the radial stator bearing surface 7 are shown in FIG. 7A. In the present case, the stator radius RSTAT is selected so that it differs from the rotor radius RROT(T1) only by the nominal thickness DL of the air gap 17. A "nominal thickness DL of the air gap 17" means an air gap expansion in the radial direction 4 given which the air bearing 1 has a nominal load.

Figure 7B:
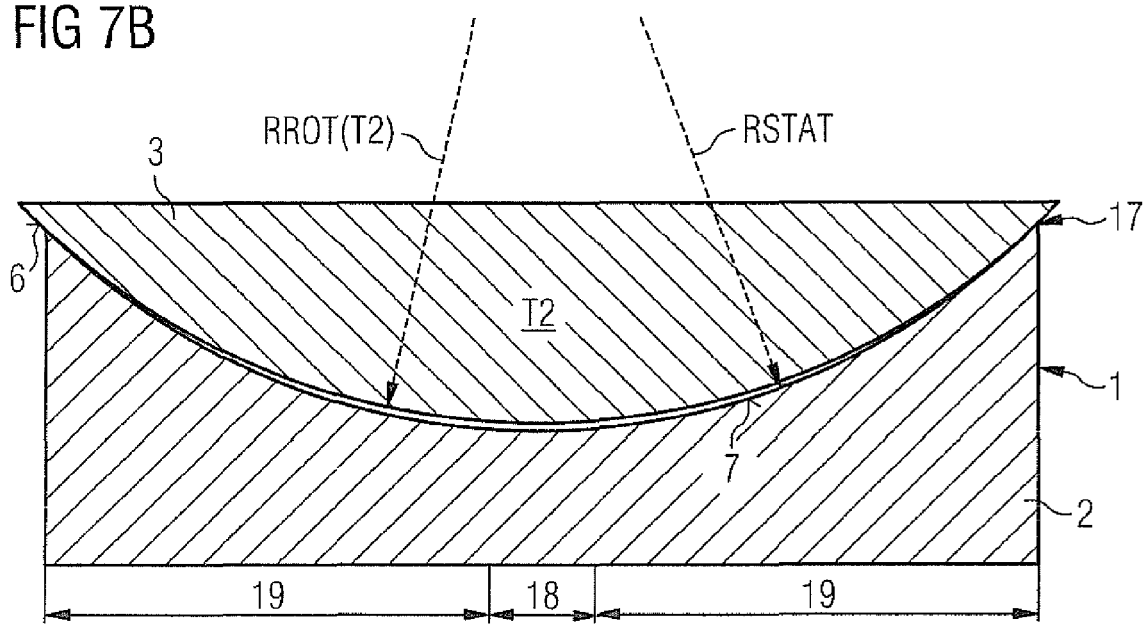

However, such a selected dimensioning of the radial stator bearing surface 7 of the air bearing 1 leads to a breakdown of the supporting effect of the air bearing 1 upon heating of the rotor 1, as this is illustrated in FIG. 7B. The radius of the rotor varies due to the heating of the rotor 3 to the operating temperature T2, which is symbolized in FIG. 7B by a rotor radius RROT(T2) at operating temperature T2. The expansion of the rotor 3 leads to the situation that, starting from the central region 18, the air gap continuously reduces its air gap thickness in the border regions 19 until the rotor 3 ultimately hits the edges of the radial stator bearing surface 7. At the same time, an increase in the air gap thickness in the central region 18 is to be expected, such that the supporting effect of the air gap in this central region 18 decreases, and thus the striking at the edges of the radial stator bearing surface 7 is abetted or, respectively, accelerated. This disadvantageous design of the air bearing 1 thus does not cope with the requirements that are incurred by temperature fluctuations.

Figure 8A:
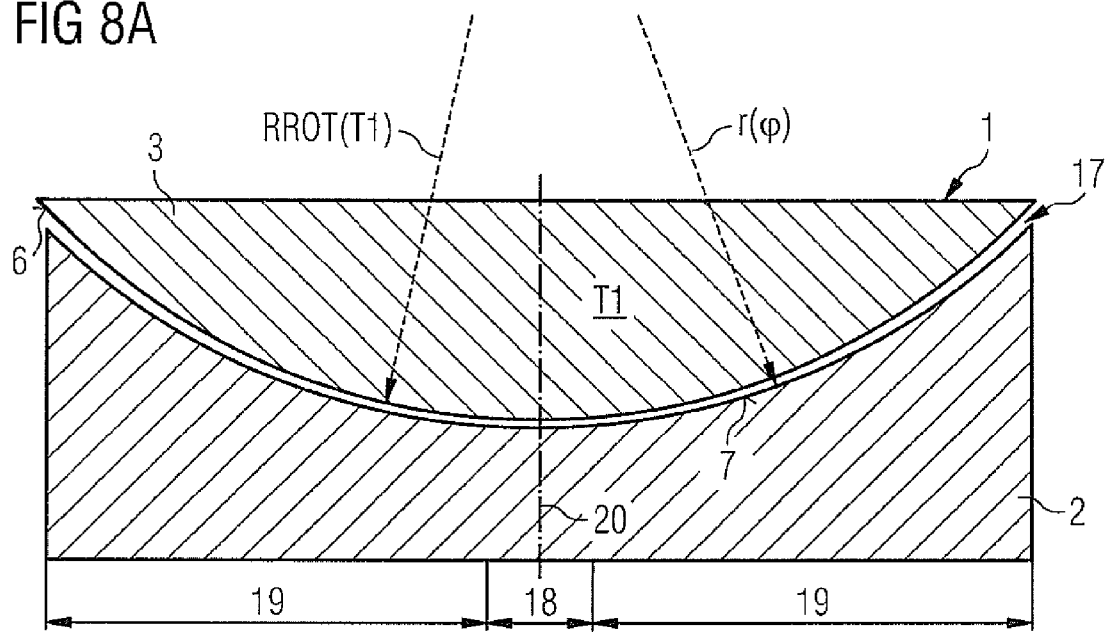
FIGS. 8A and 8B, analogous to FIGS. 7A and 7B, show the effect of the measures according to the invention in an air bearing according to the invention.
Figure 8B:
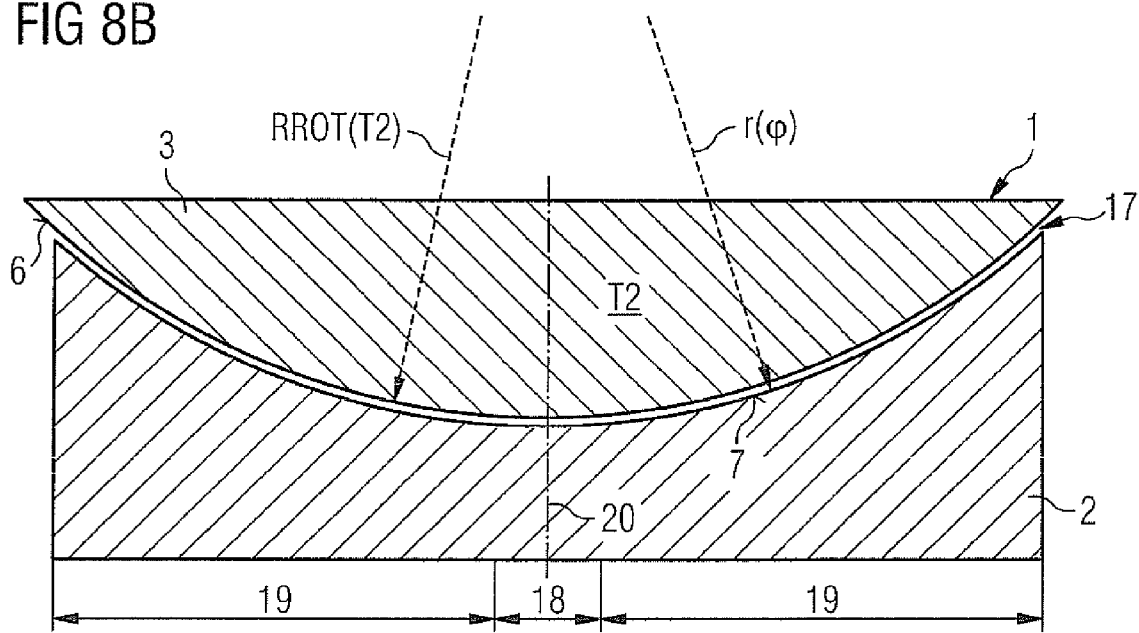

In contrast to this, given a radial stator bearing surface 7 that is symmetrically designed in the circumferential direction (as this is shown in FIG. 8A), it is provided according to the invention that the profile of the radial stator bearing surface 7 varies along the circumferential direction of the rotor 3 such that—given an initial temperature T1 that deviates from the operating temperature T2—upon operation of the air bearing 1 an air gap of smaller thickness measured in the radial direction 4 exists in the central region 18 of the radial stator bearing surface 7 between the radial stator bearing surface 7 and the radial rotor bearing surface 6 in comparison to the border region 19 of the radial stator bearing surface 7 running corresponding to the circumferential direction. The shape of this profile running along the circumferential direction can advantageously be described by the following function (Equation 1), which essentially describes a segment of a spiral which continuously increases its radius starting from the central region 18, or more precisely from a central line 20 toward the edges of the radial stator bearing surface 7.

$$r(\varphi) = R_{T1} + \Delta r \cdot \frac{\varphi}{\hat{\varphi}} \qquad (1)$$

Figure 9:
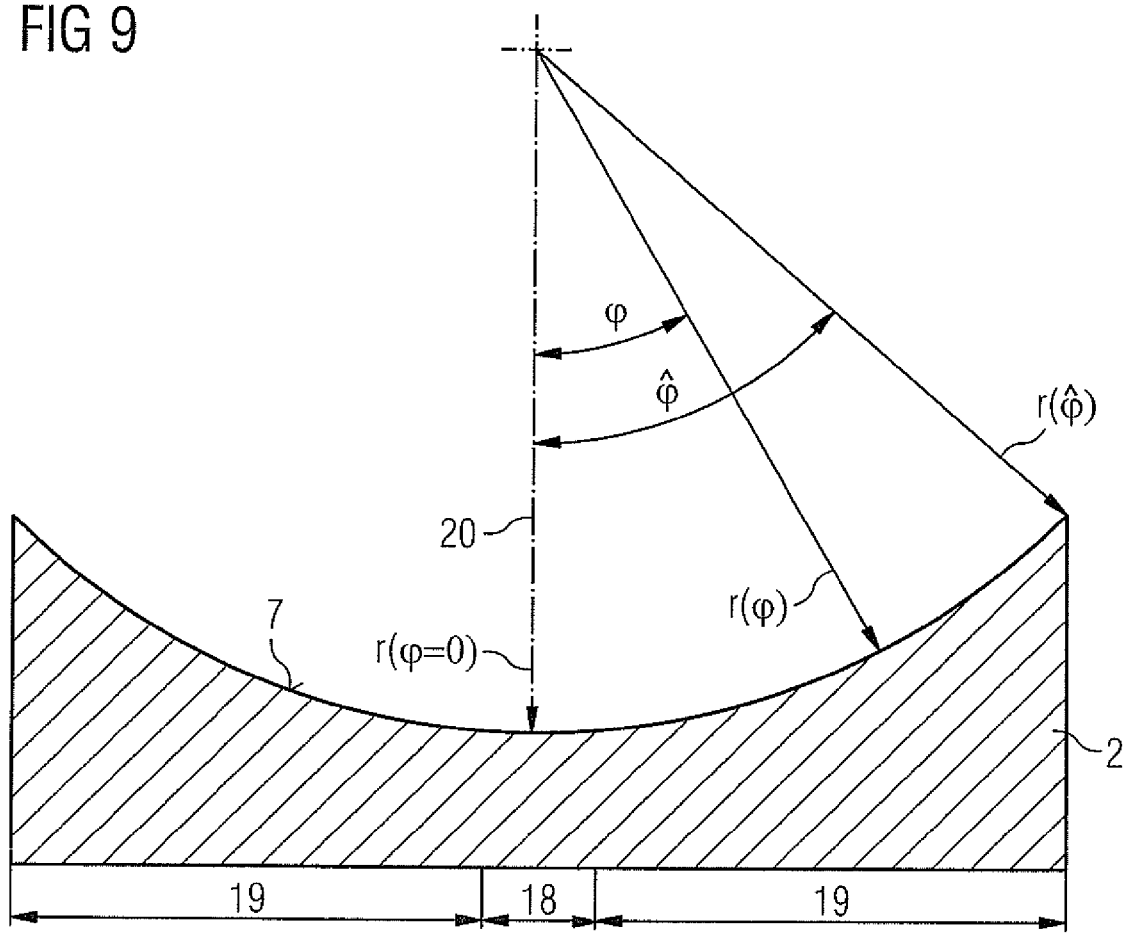
FIG. 9 is a visualization of parameters used to describe a profile of the radial stator bearing surface of the air bearing according to the invention.

The parameter RT1 is the radius RROT(T1) of the rotor 3 plus a nominal thickness DL of the air gap 17 at the initial temperature (T1). The parameter RT1 thus describes the thickness of the air gap 17 that exists between the radial rotor bearing surface 6 and the central region 18 of the radial stator bearing surface 7 at the initial temperature T1 as soon as the air bearing is started and has developed the supporting air film. The parameter is an angle segment that spans half of the radial stator bearing surface 17 measured from its central line 20 to its edge, following the circumferential direction of the rotor 3. The parameter Δr describes the radius difference of the rotor 3 due to expansion given an increase of the temperature from the initial temperature T1 to the operating temperature T2. The parameter φ is an angle parameter variable in a range between 0°≦φ≦ that parameterizes the radius difference Δr or the radius growth along the angle segment cp. The value of the radius difference Δr is given by the difference between the radius of the "warm" rotor 3—thus the rotor radius RROT(T2)—and the radius of the "cold" rotor 3, thus the rotor radius RROT(T1). The parameters used in connection with the function describing the profile are visualized in FIG. 9.

With such an embodiment of the profile, the air gap thickness of the air gap 17 at the initial temperature T1 increases continuously from the central line 20 toward the edges of the radial stator bearing surface 7. The increase of the air gap thickness is dimensioned such that the rotor 3 is allowed to increase its cold rotor radius RROT(T1) which exists at the initial temperature T1 up to its "warm" rotor radius RROT (T2) which exists at the operating temperature T1 without the radial rotor bearing surface 6 coming into contact with the radial stator bearing surface 7. The profile is additionally produced such that, at the operating temperature T2, the air gap 17 formed between the radial stator bearing surface 7 and the radial rotor bearing surface 6 possesses an essentially homogeneous thickness along the circumferential direction of the rotor 3. The situation upon achieving the operating temperature T2 is schematically shown in FIG. 8B with regard to the relevant geometric relationships.

Due to the provision of the measures according to the invention, the advantage is consequently attained that a space-saving, positive air bearing 1 can be used, and at the same time a temperature-insensitive solution is attained given an optimal air gap thickness. This in turn significantly expands the field of use of the positive air bearing 1 because in computed tomography systems a significant heat source is typically coupled with the rotor 3 of the air bearing 1. In such a CT system, the x-ray tube and the detector are namely attached to what is known as a drum, wherein the drum is borne by the rotor 3. The x-ray tube and its power source form the significant cause of the significant temperature differences between the initial temperature T1 and the operating temperature T2 to which the rotor 3 of the air bearing 1 is exposed.

In FIG. 10A, the stator 2 according to a preferred exemplary embodiment of the invention is shown in a first perspective in which the stator 2 forms an annular housing. The housing possesses a rear housing half 21 and a front housing half 22. The groove in which the radial rotor bearing surfaces 6 or, respectively, axial rotor bearing surfaces 8 of the rotor 3 can be accommodated when the rotor 3 is inserted into the two housing halves 21 and 22 (as this is also shown in FIG. 11A) is also visible on the inside of the housing. The stator 3 shown in FIG. 10A has on its inner side an axially proceeding inner annular stator wall 23 that circumferentially encloses the rotor 3. In FIG. 10B, the radial stator bearing surface 7 is shown detached from the housing, wherein in the present case a centrally placed radial stator bearing surface 7 is shown that is attached to the underside of the inner annular stator wall 23. The radial stator bearing surface 7 possesses the profile according to FIG. 8A. In operation the radial stator bearing surface 7 to support the rotor 3. If the air bearing 1 is deactivated, the rotor 3 rests on the radial stator bearing surface 7 or, respectively, in its central region 18. The stator 2 shown in FIG. 10A furthermore has inner stator side walls 24 which at least partially enclose the rotor 3 at two different axial positions of the rotor 3 in its radial direction 4. Each of these inner stator side walls 24 which are situated opposite one another bears at least one axial stator bearing surface 9, wherein a pair forming axial stator bearing surfaces 9 are respectively arranged opposite one another. This is shown detached from the housing in FIG. 10B, wherein supported or attached axial stator bearing surfaces 9 are clearly visible in particular in the upper region of the housing. Of the oppositely situated axial stator bearing surfaces 9 that are fashioned or, respectively, positioned corresponding to the position of the radial stator bearing surface 7, only the upper axial stator bearing surface 9 in the lower region of the stator 2 is visible.

The assembled air bearing 1 is shown in a second perspective in FIG. 11A, wherein the rotor 3 is shown installed in the housing realizing the stator 2. Analogous to FIG. 10B, in FIG.

11B the radial bearing surface 7 or axial bearing surface 9 of the stator 2 is shown detached from the assembled air bearing 1.

Finally, the housing of the air bearing 1 that realizes the stator 2 is shown in a third perspective in FIG. 12A so that the underlying radial stator bearing surface 7 in the housing is clearly visible. According to this perspective representation, ultimately the axial stator bearing surfaces 9 arranged in the lower region, parallel to the underside of the air bearing 1, are also visible in FIG. 12B.

Figure 13A:
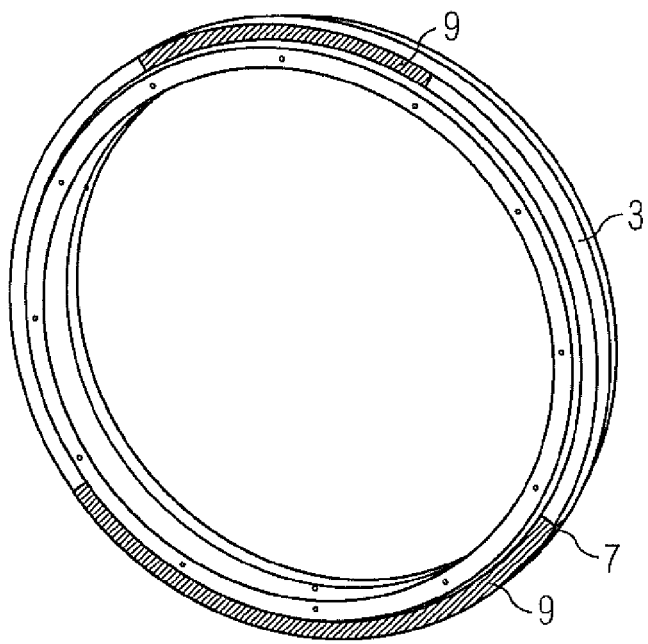
FIG. 13A shows an interaction of the bearing surfaces of the stator of the air bearing according to FIG. 10A with the rotor of the air bearing, in a first perspective.
Figure 13B:
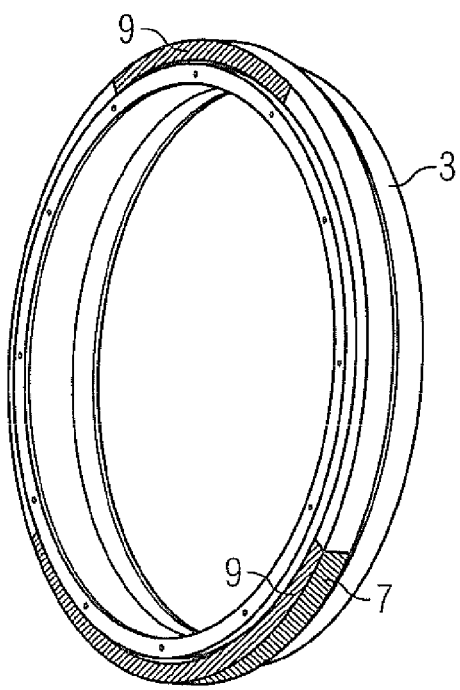
FIG. 13B shows the interaction according to FIG. 13A in a second perspective.
Figure 13C:
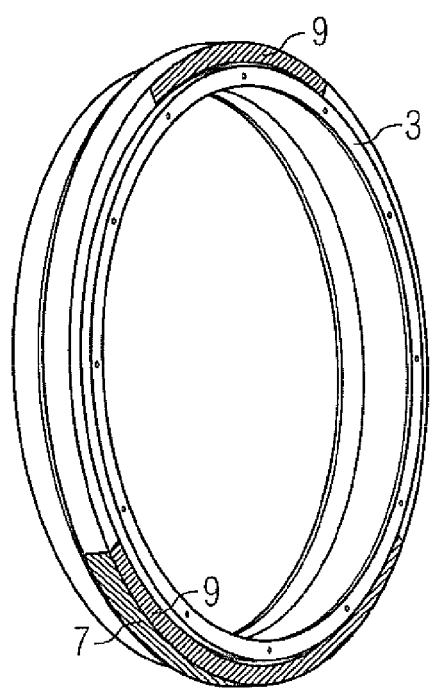
FIG. 13C shows the interaction according to FIG. 13A in a third perspective.

The rotor 3 and the interaction of the radial stator bearing surface 7 and the axial stator bearing surfaces 9 with the rotor 3 are shown in FIGS. 13A, 13B and 13C. The interaction is shown from three different perspectives in order to visualize the position of the bearing surface 7 and 9 of the stator 2 in relation to the rotor 3.

Figure 2B:
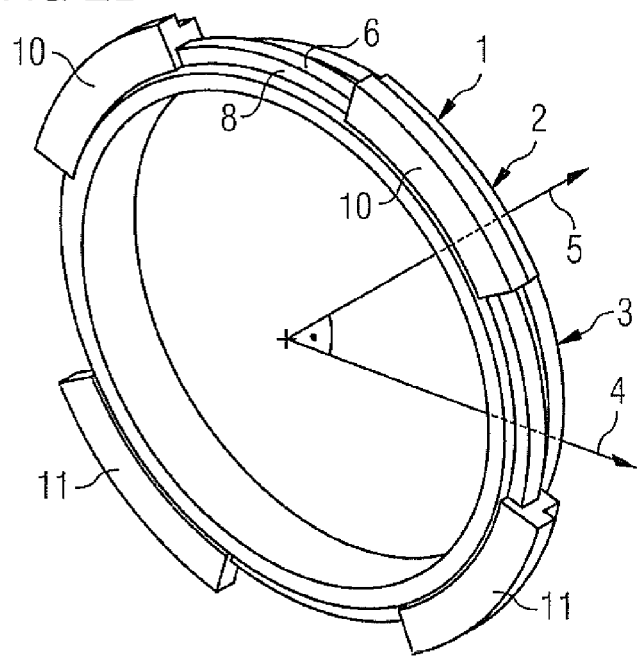
Figure 2C:
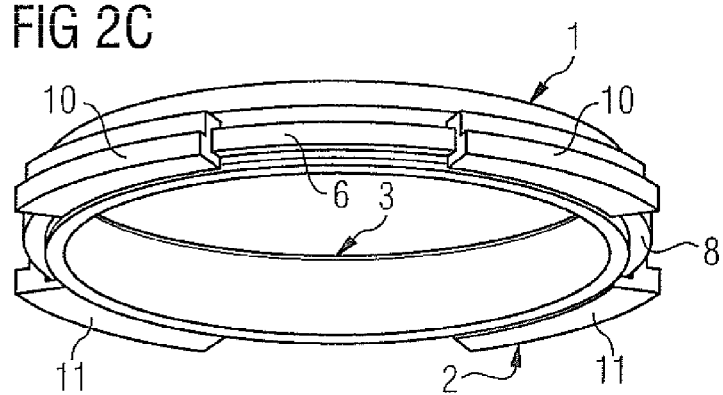

In contrast to the exemplary embodiment shown in FIGS. 2-2b and the embodiment according to FIGS. 3A-3L, in the preferred exemplary embodiment of the invention that is shown in FIGS. 10A through 13C has the advantage that it is instead of stator bearing elements being provided, rather the radial stator bearing surface 7 only forms one segment. It is thereby ensured that the entire air bearing 1 can be executed as rigidly as is possible, so a deformation of the housing can be kept as slight as possible, and therefore it is reliably avoided that the different bearing surfaces 7 and 9 that are attached to the housing come into contact with the rotor 3 due to forces acting on the rotor 3. The fact that a housing positively and completely enclosing the rotor 3 is now used no longer plays a role with regard to the difference between the initial temperature T1 and the operating temperature T2 since the inner diameter of the housing can be selected to be of corresponding size, detached from the specific design or profile of the radial stator bearing surface 7. The thermal insensitivity and the sufficient carrying force of the air bearing 1 is in particular abetted by the specific segmentation or, respectively, positioning of the individual radial stator bearing surface 7 or a number of such radial stator bearing surfaces 7. For example, as explained in the preceding a single radial stator bearing surface 7 can be provided in the lower region of the housing. Furthermore, multiple such radial stator bearing surfaces 7 can be provided at a distance from one another or without spacing between one another in the lower region or along the entire lower half of the annular housing. Due to the special profile of each of these radial stator bearing surfaces 7 and due to the possibility of the upward expansion of the rotor 3 due to heat, the rotor 3 cannot come into contact or seize with the stator 2 or, respectively, the single radial stator bearing surface 7 or the radial stator bearing surfaces 7. With regard to the maximum load of the air bearing 1, it has proven to be particularly advantageous when multiple (for example two or more) such specially shaped radial stator bearing surfaces 7 are arranged directly adjoining one another or separated from one another only by a relatively small distance, next to one another in the lower region of the annular housing, because the effective area of the air bearing 1 can thus be kept as large as possible and the required carrying force of the air bearing 1 is thus easy to achieve. In a preferred embodiment, it can be provided that a relatively high number (10, 20 or even more) of such segmented radial stator bearing surfaces 7 are arranged next to one another. In any case, by the measures according to the invention it is ensured that a contact between the rotor 3 and the stator 2 is to be reliably avoided given the temperature difference that is to be expected between the initial temperature T1 and the operating temperature T2 and the expansion of the rotor 3 that is therefore incurred.

Figure 14:
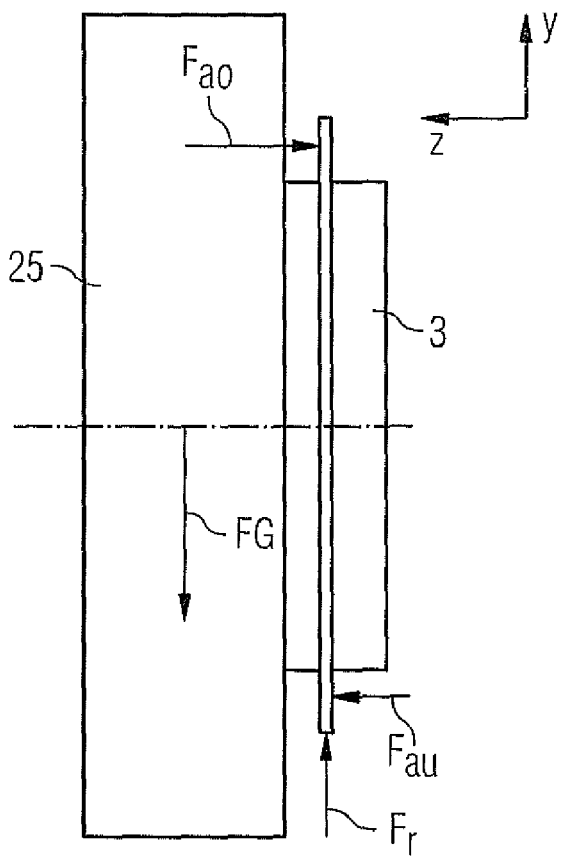
FIG. 14 schematically illustrates the forces acting on the air bearing.

One of many possible, appropriate applications of the air bearing 1 according to the invention is provided in CT systems. Given use in such a CT system, the air bearing 1 is used to bear a drum 25 attached to the rotor 3, as this is schematically shown in FIG. 14. The counterpart to the rotor 3, namely the stator 2, is attached to a drum carrier that is not depicted in FIG. 14, for clarity.

The force relationships which must be handled by the air bearing 1 given a use according to the invention are shown in FIG. 14. The weight FG now acts on the rotor 3. This weight FG must be transferred via the radial stator bearing surface 7 to the rotor 3. Since the weight FG attacks the drum 25 at the focal point, a moment also acts on the air bearing 1. Therefore, the axial stator bearing surfaces 9 must apply a first force $F_{ao}$ which acts on the upper axial stator bearing surfaces 9 and the lower axial stator bearing surfaces 9 must apply a second force $F_{au}$ in order to prevent a tipping of the drum 25. In order to prevent the lowering of the rotor 3, the radial stator bearing surface 7 must apply a third force Fr that counteracts the weight FG.

Figure 15:
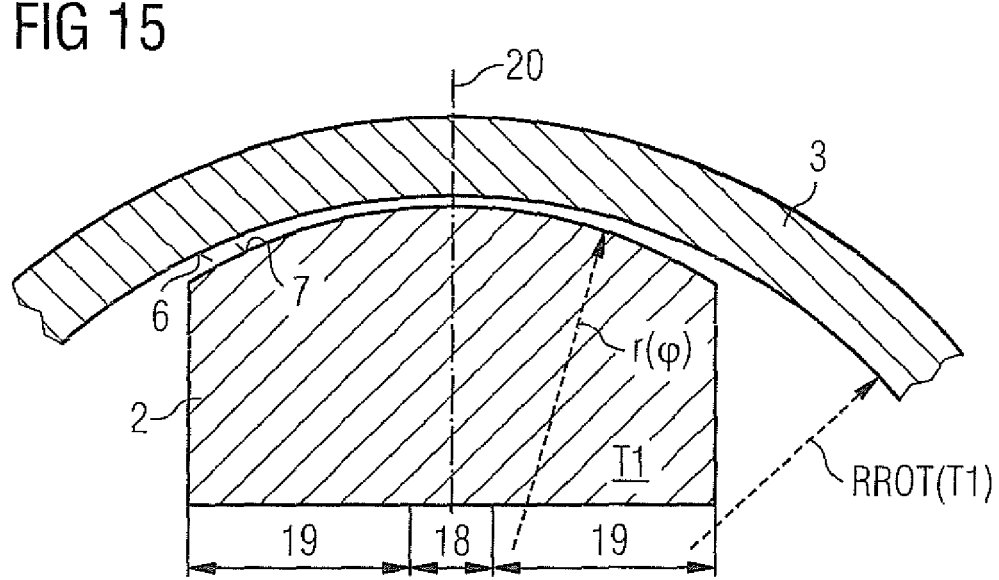
FIG. 15 schematically illustrates the principle of an additional exemplary embodiment of the air bearing according to the invention.

According to a further exemplary embodiment of the invention, it can also be provided that the stator 2 is arranged inside the rotor 3 that is borne such that it can rotate around the stator 2. The principle of this exemplary embodiment is schematically shown in FIG. 15. In this case as well, the measures according to the invention are used and achieve the advantages and effects achieved with the exemplary embodiments that have already been explained, wherein in the present case the shape of the profile of the radial stator bearing surface 7 according to the invention offers sufficient space for a cooling of the rotor 3 from an initial temperature T1 up to an operating temperature T2, as well as for shrinking of the rotor 3. In such a case the stator 2 can be fashioned as an inner housing for the rotor 3 that is open to the outside. Insulated bearing elements are likewise possible as this was explained in connection with the preceding embodiments. In this embodiment, the design details explained in the preceding are also applicable with the corresponding adaptations taking into account the modified geometry.

In summary, the measures of the invention offer a number of advantages. An actual maintenance-free air bearing 1 is thus obtained via the ensured no-contact running of the air bearing 1. Furthermore, a noise reduction that is essentially independent of rotation speed is achieved. A savings potential in the area of the motor results due to the freedom from wear or relative lack of wear of the air bearing 1 because a far lower motor torque is required. A more stable linear frequency response of the damping properties of the air cushion is attained. The complete structure and operation of the air bearing 1 can be realized more cost-effectively, wherein a savings potential results in the area of the structure as well as in the area of the energy consumption. Due to the positive structure of the air bearing, the required stability and a space-saving design are achieved. Finally, it is ensured that the expansion of the rotor 3 due to temperature is reliably compensated, and therefore this has no negative effect on the performance of the air bearing 1.

Although modifications and changes may be suggested by those skilled in the art, it is the intention of the inventors to embody within the patent warranted hereon all changes and modifications as reasonably and properly come within the scope of their contribution to the art.

We claim as our invention:

1. An air bearing to support a body, comprising:
   a rotor having a circularly curved radial rotor bearing surface proceeding along a circumferential direction of the rotor;

a stator having at least one radial stator bearing surface proceeding partially adjacent to the rotor in the circumferential direction, said radial stator bearing surface being curved according to a profile following the circumferential direction of the rotor and defining an air gap between the stator bearing surface and the radial rotor bearing surface that supports the rotor with an air current in the air gap; and said profile being configured to shape said air gap to give a second region of the radial stator bearing surface a smaller thickness, measured radially, in comparison to a first region of the radial stator bearing surface along the circumferential direction, at a starting temperature that deviates from an operating temperature.

2. An air bearing according to claim 1, wherein the profile is configured to give an air gap, at the operating temperature, a substantially uniform thickness along the circumferential direction of the rotor.

3. An air bearing according to claim 1, wherein the radial stator bearing surface is configured with the first region forming a border region of the radial stator bearing surface and with the second region forming a central region of the radial stator bearing surface, and wherein the profile is symmetrical relative to a central line of the central region.

4. An air bearing according to claim 3, wherein the profile is configured according to the function $$r(\varphi) = R_{T1} + \Delta r \cdot \frac{\varphi}{\hat{\varphi}},$$

wherein $R_{T1}$ is the radius (RROT(T1)) of the rotor plus a nominal thickness of the air gap (17) at the initial temperature, $\hat{\varphi}$ is an angle segment that spans half of the radial stator bearing surface measured from its central line to its edge, following the circumferential direction of the rotor, $\Delta r$ is a radius difference of the rotor between the initial temperature and the operating temperature, and $\varphi$ is an angle parameter that is variable in a range between $0 \cdot \hat{\varphi} \cdot \hat{\varphi}$, which angle parameter parameterizes the radius difference $\Delta r$ along the angle segment $\hat{\varphi}$.

5. An air bearing according to claim 1, wherein said at least one radial stator bearing surface is positioned in the circumferential direction to cause the second region to coincide with a projection of the center of gravity of the rotor onto this second region.

6. An air bearing according to claim 1, wherein on a side thereof facing toward the rotor along the circumferential direction, the stator exhibits a radial expansion at points that are free of the at least one radial stator bearing surface, said radial expansion being greater than a radial expansion that is required for operation of the air-borne rotor at the operating temperature.

7. An air bearing according to claim 1, wherein the stator has at least two axial stator bearing surfaces that supportively bear the rotor in the axial direction of the rotor.

8. An air bearing according to claim 7, wherein the at least two axial stator bearing surfaces are located to correspond to a position of the at least one radial stator bearing surface at the stator.

9. An air bearing according to claim 7, comprising at least two additional axial stator bearing surfaces located axially opposite the position of the at least one radial stator bearing surface at the stator.

10. An air bearing according to claim 7 wherein the stator is comprised of a plurality of segments, to which the at least two axial stator bearing surfaces are respectively attached.

11. An air bearing according to claim 1, wherein the stator has a housing that circumferentially encloses the rotor with an inner annular stator wall, and wherein the at least one radial stator bearing surface is attached to the inner annular stator wall.

12. An air bearing according to claim 11, wherein the stator has at least two axial stator bearing surfaces that supportively bear the rotor in the axial direction of the rotor, and wherein the housing of the stator at least partially surrounds the rotor at two different axial positions of the rotor in the radial direction with a respective inner stator side wall, and wherein one of said axial stator bearing surfaces is axially mounted on the respective inner stator side wall relative to the other axial stator bearing surface.

13. An air bearing according to claim 1, wherein the stator is comprised of a plurality of segments to which the at least one radial stator bearing surface is attached.

14. An air bearing according to claim 1, wherein the rotor has a flange configured for attachment thereto of a drum of a computed tomography system.

15. An air bearing according to claim 1, wherein the bearing surfaces are made of porous graphite.

16. A computed tomography system comprising:

a rotatable drum carrying components for acquiring computed tomography data from an examination subject around which the drum rotates;

an air bearing comprising a rotor having a circularly curved radial rotor bearing surface proceeding along a circumferential direction of the rotor, a stator having at least one radial stator bearing surface proceeding partially adjacent to the rotor in the circumferential direction, said radial stator bearing surface being curved according to a profile following the circumferential direction of the rotor and defining an air gap between the stator bearing surface and the radial rotor bearing surface that support the rotor with an air current in the air gap, and said profile being configured to shape said air gap to give a second region of the radial stator bearing surface a smaller thickness, measured radially, in comparison to a first region of the radial stator bearing surface along the circumferential direction, at a starting temperature that deviates from an operating temperature; and a flange that attaches said drum to said rotor.

* * * * *